United States Patent
Kim et al.

(10) Patent No.: US 9,482,854 B2
(45) Date of Patent: Nov. 1, 2016

(54) SIDE-EMITTING LED LENS AND BACKLIGHT UNIT AND DISPLAY DEVICE HAVING THE SAME

(71) Applicant: ANYCASTING CO., LTD., Seoul (KR)

(72) Inventors: Sungbin Kim, Gyeonggi-do (KR); Byungwook Kim, Incheon (KR); Moonjae Lee, Kyeongsangnam-do (KR); Jaeyou Jung, Gyeonggi-do (KR)

(73) Assignee: ANYCASTING CO., LTD., Seoul (KR)

(*) Notice: Subject to any disclaimer, the term of this patent is extended or adjusted under 35 U.S.C. 154(b) by 5 days.

(21) Appl. No.: 14/070,605

(22) Filed: Nov. 4, 2013

(65) Prior Publication Data
US 2014/0167594 A1  Jun. 19, 2014

(30) Foreign Application Priority Data
Dec. 18, 2012  (KR) .................... 10-2012-0147982

(51) Int. Cl.
*F21K 99/00* (2016.01)
*G02B 19/00* (2006.01)

(52) U.S. Cl.
CPC ....... *G02B 19/0071* (2013.01); *G02B 19/0028* (2013.01); *G02B 19/0061* (2013.01)

(58) Field of Classification Search
CPC .................................................. G02B 19/0071
USPC ............... 362/555, 311.02, 311.06, 311.07, 362/311.08, 311.09, 311.1, 311.14, 311.12
See application file for complete search history.

(56) References Cited

U.S. PATENT DOCUMENTS

| | | | |
|---|---|---|---|
| 6,679,621 B2* | 1/2004 | West et al. | 362/327 |
| 7,083,313 B2 | 8/2006 | Smith | |
| 7,959,328 B2* | 6/2011 | Wanninger | 362/309 |
| 8,118,457 B2* | 2/2012 | Kanai | 362/327 |
| 2006/0076568 A1* | 4/2006 | Keller et al. | 257/98 |
| 2006/0226436 A1 | 10/2006 | Liu et al. | |
| 2006/0238884 A1* | 10/2006 | Jang et al. | 359/653 |
| 2007/0109791 A1 | 5/2007 | Chinniah et al. | |
| 2007/0183736 A1* | 8/2007 | Pozdnyakov et al. | 385/146 |

(Continued)

FOREIGN PATENT DOCUMENTS

| | | |
|---|---|---|
| CN | 201992566 U | 9/2011 |
| KR | 10-0639873 B1 | 10/2006 |

(Continued)

OTHER PUBLICATIONS

International Search Report in International Application No. PCT/KR2013/011818, dated Mar. 25, 2014.

*Primary Examiner* — Nimeshkumar Patel
*Assistant Examiner* — Jacob R Stern
(74) *Attorney, Agent, or Firm* — Park, Kim & Suh, LLC

(57) ABSTRACT

A side-emitting LED lens includes a bottom surface having an incident surface through which light from the LED enters, a top surface that reflects light, and a side surface which connects the bottom surface to the top surface, and through which light exits the lens. Within the incident surface, a central area directs light emitted from the LED to the top surface by refracting the light in a direction away from the optical axis, whereby the height of the lens can be reduced. A surrounding area connected to the central area directs light emitted from the LED to the top surface by refracting the light in a direction toward the optical axis, whereby the width or radius of the lens can be reduced.

21 Claims, 8 Drawing Sheets

(56) References Cited

U.S. PATENT DOCUMENTS

2007/0195534 A1    8/2007  Ha et al.
2007/0273984 A1*  11/2007  Pao et al. ........................ 359/726
2008/0089062 A1*   4/2008  Vennetier et al. ............ 362/241
2009/0129097 A1*   5/2009  Ewert ................. B29C 45/0025
                                                         362/328

FOREIGN PATENT DOCUMENTS

| TW | 200827617 A | 7/2008 |
| TW | 200908366 A | 2/2009 |
| WO | 2008/155705 A1 | 12/2008 |

* cited by examiner

SIDE-EMITTING LED LENS AND BACKLIGHT UNIT AND DISPLAY DEVICE HAVING THE SAME

CROSS REFERENCE TO RELATED APPLICATION

This application claims priority to Korean Patent Application No. 10-2012-0147982, filed on Dec. 18, 2012, in the Korean Intellectual Property Office, the entire disclosure of which is incorporated herein by reference.

BACKGROUND

1. Field of the Invention

The present invention relates, in general, to a side-emitting light-emitting diode (LED) lens that is configured such that the overall volume thereof can be reduced, and a backlight unit (BLU) and display device having the same.

2. Description of the Related Art

Generally, liquid crystal displays (LCDs) are provided in display devices that are used for computer monitors, TVs, or the like. Such LCDs require a separate light source since they do not generate light themselves.

As light sources for LCDs, several fluorescent lamps, such as a cold cathode fluorescent lamp (CCFL), an external electrode fluorescent lamp (EEFL), or a plurality of light-emitting diodes (LEDs) are used. Light sources are provided on a backlight unit (BLU) together with a light guide plate (LGP), a plurality of optical sheets, a reflector plate, and the like.

Recently, from among these light sources, LEDs are attracting interest as a next-generation light source since they consume less power, have superior endurance, and can reduce manufacturing costs. However, when LEDs are used as a light source, light tends to be emitted while being confined to a restricted area. Therefore, in order to apply LEDs to a planar light source, such as a display device, it is required to make the light be uniformly distributed over a wider area.

Therefore, recently, LED lenses that perform such a function are under active study. A "SIDE-EMITTING LED LENS" was disclosed in U.S. Pat. No. 6,679,621. However, this invention has problems related to difficulties in its fabrication.

A "SIDE-EMITTING LED AND LENS ADAPTED THERETO" was disclosed in Korean Patent No. 10-0639873. FIG. 1 is a view showing the lens of the related art.

As shown in FIG. 1, the lens 1 has an incident surface, a top surface 2, and a side surface 3. The incident surface includes a convex surface 4, incident surfaces 5 and lower total reflection surfaces 6. The incident surfaces 5 and the lower total reflection surfaces 6 are connected to and alternate with each other.

With this configuration, a ray of light generated by an LED 7 enters through the convex surface 4 of the incident surface and then is incident on the top surface 2, in a substantially vertical direction, through the convex surface 4. In contrast, another ray of light generated by the LED 7 enters through one incident surface 5 and is reflected from the lower total reflection surfaces 6 before being incident on the top surface 2 in a substantially vertical direction. In addition, the light that has struck the top surface 2, in a substantially vertical direction, is totally reflected from the top surface 2 so as to be emitted to the outside through the side surface 3.

However, as in the lens 1, the top surface 2 must be steeply inclined upward in order to totally reflect the light that is incident on it in a substantially vertical direction. This significantly increases the overall height of the lens 1, as well as the overall volume of the lens 1, which can be problematic. In addition, when the overall volume of the lens 1 is increased as such, the material costs for manufacture of the lens 1 are also increased, thereby increasing the overall manufacturing costs of the lens.

The foregoing is intended merely to aid in the understanding of the background of the present invention, and is not intended to mean that the present invention falls within the purview of the related art that is already known.

SUMMARY

Accordingly, the present invention has been made cognizant of the above problems occurring in the related art, and the present invention is intended to provide a side-emitting light-emitting diode (LED) lens, wherein the overall volume of which can be reduced.

Also provided is a side-emitting LED lens in which the overall light efficiency can be improved when an LED light source is a planar light source instead of a point light source.

In order to achieve at least one of the above objectives, according to one aspect of the present invention, there is provided a side-emitting LED lens which causes light that is emitted from an LED to exit the lens through a side surface of the lens. The side-emitting LED lens includes a bottom surface having an incident surface through which light emitted from the LED enters the lens; a top surface which reflects light that has entered the lens through the incident surface, and is directly incident on the top surface; and a side surface, which connects the bottom surface to the top surface, and through which light that is directly incident on the side surface—reflected from the top surface and originating from light that has entered the lens through the incident surface—exits the lens. The incident surface includes a central area which further includes an optical axis of the LED, wherein the central area directs light emitted from the LED to the top surface by refracting the light in a direction away from the optical axis, whereby the height of the lens can be reduced; and a surrounding area connected to the central area, wherein the surrounding area directs light emitted from the LED to the top surface by refracting the light in a direction toward the optical axis, whereby the width or radius of the lens can be reduced.

According to another aspect of the present invention, there is provided a backlight unit that includes an LED light source; and the LED lens positioned above the LED light source.

According to another aspect of the present invention, there is provided a display device that includes an LED light source; and the LED lens positioned above the LED light source.

According to an aspect of the present invention having the above-described configuration, it is possible to reduce the height of the side-emitting LED lens due to the incorporated central area of the incident surface, and reduce the width of the side-emitting LED lens due to the incorporated surrounding area of the incident surface, thereby reducing the overall volume of the lens. This consequently reduces the material costs, and thus the overall manufacturing costs, of the side-emitting LED lens.

In addition, the side-emitting LED lens according to the present invention resolves the overall light efficiency of the LED since the LED light source is a planar light source instead of a point light source.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION

Reference will now be made in detail to embodiments according to the present invention with reference to the accompanying drawings so that a person having ordinary skill in the art to which the present invention relates can easily put the present invention into practice.

The present invention is intended to cover not only the exemplary embodiments, but also various alternatives, modifications, equivalents, and other embodiments, examples of which are illustrated in the accompanying drawings and described below. However, it is to be understood that the present description is not intended to limit the present invention to those exemplary embodiments, but shall include all corrections, equivalents, and substitutions that do not depart from the principle of the present invention as defined by the Claims.

In the accompanying drawings, the relative thickness and sizes can be exaggerated for clear understanding of the specification, and thus, the present invention is not limited to the relative size or thicknesses shown in the accompanying drawings.

The present invention relates to a side-emitting LED lens which can be reduced in overall volume, thereby reducing material costs, and which improves light efficiency by considering the LED light source as a planar light source. In addition, the present invention relates to a backlight unit (BLU) and a display device including the same LED lens. However, detailed descriptions of the configurations of the backlight unit and the display device, except for the LED lens according to the invention, will be omitted herein since they can be easily put into practice by a person having ordinary skill in the art to which the present invention belongs.

Figure 1:
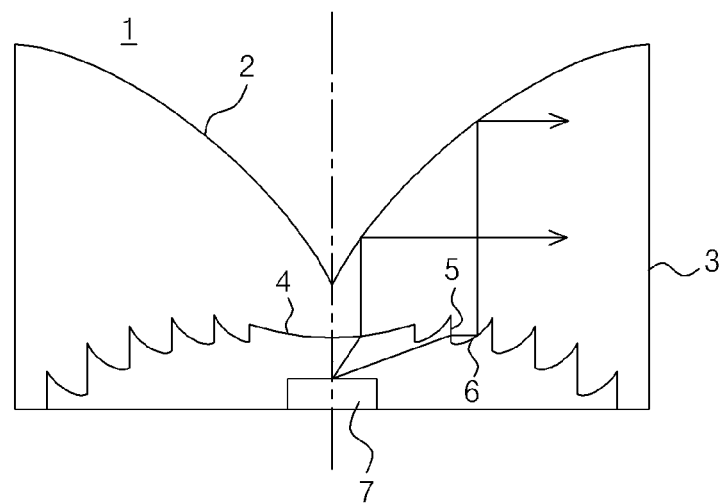
FIG. 1 is a vertical cross-sectional view showing a lens of the related art.
Figure 2:
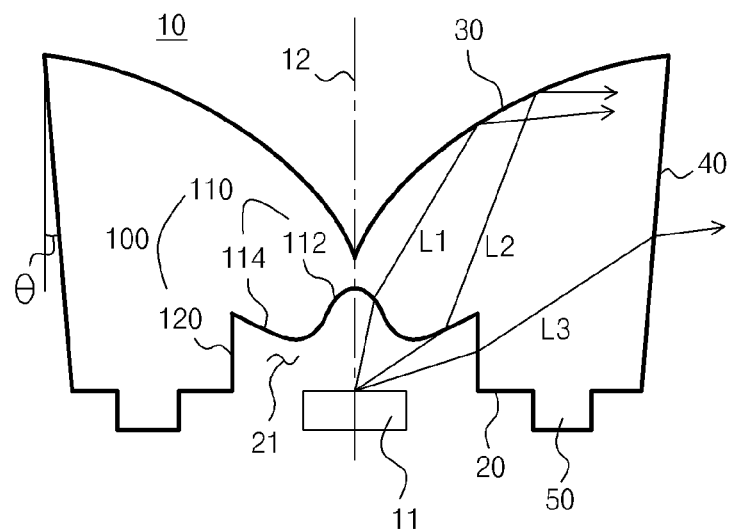
FIG. 2 is a vertical cross-sectional view showing a side-emitting LED lens according to an embodiment of the present invention.

FIG. 2 is a vertical cross-sectional view showing a side-emitting LED lens according to an embodiment of the present invention.

Referring to FIG. 2, a side-emitting LED lens 10 according to the present invention includes a bottom surface 20, a top surface 30, and a side surface 40 that connects the bottom surface 20 to the top surface 30.

The bottom surface 20 has an incident surface 100 onto which light emitted from a light-emitting diode (LED, hereinafter referred to as "LED") is incident. The incident surface 100 can be formed as the inner surface of a recess 21 that is situated in the central portion of the bottom surface 20.

In addition, the incident surface 100 includes an upper incident surface 110 and a side incident surface 120. The upper incident surface 110 directs rays of light L1 and L2 to the top surface 30. The rays of light L1 and L2 are within a preset range of angles, with respect to an optical axis 12, from among rays of light emitted from the LED 11. The side incident surface 120 directs a ray of light L3, from among rays of light emitted from the LED 11, that is not incident on the upper incident surface 110 to the side surface 40.

The upper incident surface 110 includes a central area 112 and a surrounding area 114. The center area 112 directs light that is emitted from the LED 11, as well as light that travels along the optical axis 12 of the LED 11, to the top surface 30 by refracting the light in a direction away from the optical axis 12. The surrounding area 114 is connected to the central area 112, and directs light emitted from the LED 11 to the top surface 30 by refracting the light in the direction towards the optical axis 12.

The central area 112 refracts the light L1, emitted from the LED 11, and travels near the optical axis 12 (i.e., the light L1 that is emitted toward the central portion of the upper incident surface 110) in a direction away from the optical axis 12, so that the light L1 is incident on the top surface 30. The surrounding area 114 causes the light L2, emitted from the LED 11, and emitted around the surrounding portion of the upper incident surface 110, to be refracted in a direction towards the optical axis 12, so that the light L2 is incident on the top surface 30. The side incident surface 120 connects the surrounding area 114 to the bottom surface 20, and directs the light L3, that is not incident on the upper incident surface 110, to the side surface 40 by refracting the light L3.

In the lens 10, according to the present invention having the above-described configuration, it is possible to reduce the height (H) of the lens 10 due to the central area 112, and reduce the width (W) of the lens 10 due to the surrounding area 114. These will be described in more detail infra.

Although the top surface 30 can be provided such that it reflects direct incident light using a coating or another member, it is preferred that the top surface 30 be optically designed such that it totally reflects incident light. In addition, it is preferred that the side surface 40 be optically designed such that it emits direct incident light to the outside. These will be described in detail infra.

The top surface 30 is a component symmetrical to the optical axis 12 of the LED 11, and reflects light L1 and L2 directly incident on the top surface 30 after being refracted while passing through the upper incident surface 110 of the incident surface 100. The side surface 40 is a component that emits light L1 and L2 that is reflected from the top surface 30, and light L3 that is directly incident on the side surface 40 after being refracted while passing through the side incident surface 120.

The side surface 40 can be configured such that it is inclined inward at a preset angle θ. For instance, the side surface 40 can be formed as an inclined surface that spreads outward at a preset orientation with respect to the optical axis 12 of the LED 11, and in an upward direction, or has a configuration that is curved downward. Consequently, when the lens 10 is manufactured by injection molding, a lower mold can be easily removed, thereby facilitating the manufacturing process.

The LED lens is typically made into a one-body structure from a transparent material having superior transmittance, such as glass, methylmethacrylate, polymethylmethacrylate (PMMA), polycarbonate (PC), or polyethylene terephthalate (PET), through injection molding. Although a plurality of molds are required for the manufacture of such an LED lens through injection molding, the LED lens 10 according to the present invention can be made through injection molding using only two molds (i.e., an upper mold and a lower mold), and the lower mold can be easily removed in the downward direction, since the side surface 40 is configured such that it is inclined inward and in a downward direction.

In addition, the lens 10, according to the present invention, further includes a leg 50 that extends downward from a preset position of the bottom surface 20 to support the lens 10.

Further, it is preferred that the top surface 30 be optically designed such that it totally reflects incident light. A detailed description will be given below of embodiments of the top surface 30 with reference to some figures.

Figure 3:
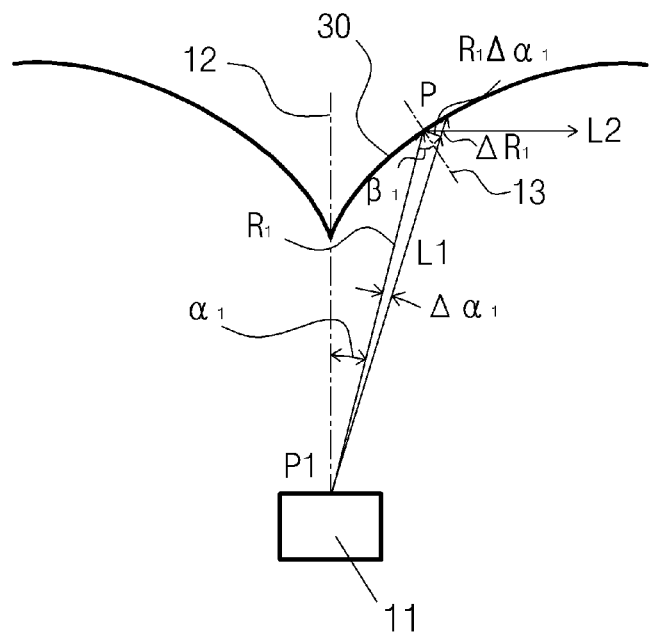
FIG. 3 to FIG. 5 are views illustrating embodiments of the top surface.

FIG. 3 is a view illustrating one embodiment of the top surface 30.

Referring to FIG. 3, when the point of intersection between the LED 11 and the optical axis 12 of the LED 11 is set as the first reference point P1, the top surface 30 can be configured so as to satisfy the relationship:

$$\Delta R_1/(R_1\Delta\alpha_1)>1/\sqrt{(n^2-1)},$$

where $\alpha_1$ is the angle defined between a line that connects a point P in the top surface 30 to the first reference point P1 and the optical axis 12, $R_1$ is the distance from the point P in the top surface 30 to the first reference point P1, $\Delta\alpha_1$ is an increment of $\alpha_1$, $\Delta R_1$ is an increment (viz., decrement or increment) of $R_1$ with respect to $\Delta\alpha_1$, $\beta_1$ is the angle defined between a normal line 13 of the point P and the line (viz., the line that connects the point P in the top surface 30 to the first reference point P1), and n is the refractive index of the material of the lens 10.

Figure 4:
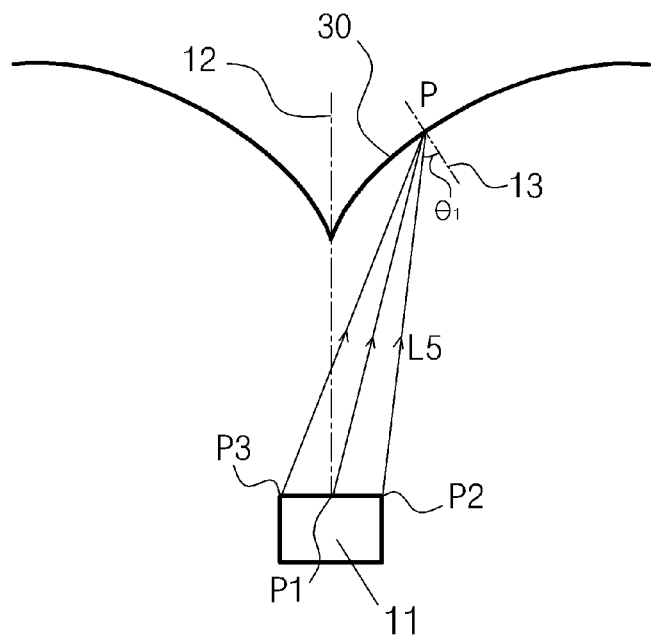
Figure 5:
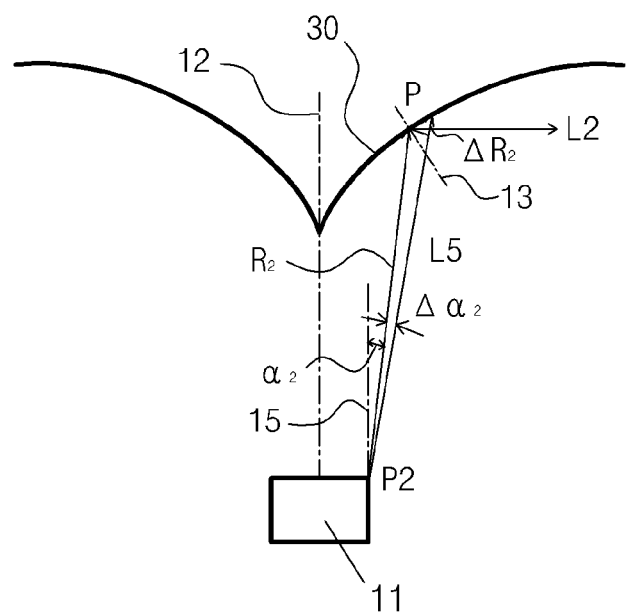

FIG. 4 and FIG. 5 are views illustrating alternative embodiments of the top surface.

Unlike the embodiment illustrated in FIG. 3, the optical condition of the top surface 30 in FIG. 4 and FIG. 5 is applicable when the light source of the LED 11 is a planar light source rather than a point light source. In fact, the volume of the lens 10 is not significantly greater than the volume of the LED 11. It is therefore preferable that the LED 11 is a planar light source when designing the lens 10.

First, with reference to FIG. 4, when the light source of the LED 11 a planar light source instead of a point light source, not only light emitted from the center of the LED 11 (i.e., the first reference point P1), but also light emitted from the opposite end points P2 and P3 of the LED 11, must be considered. In this case, a ray of light L5 is incident on the point P after being emitted from the end point P2 of the LED 11, which is on the same side as point P with respect to optical axis 12. It can be appreciated that the angle $\theta_1$ defined between the light L5 and the normal line 13 of point P is smaller than the angle defined between the normal line 13 and a ray of light that is incident on point P after being emitted from the opposite end point P3. Therefore, when the top surface 30 is configured such that it totally reflects incident light L5, emitted from the end point P2 of the LED 11 on the same side with respect to optical axis 12, and although the LED 11 is a planar light source, the top surface 30 can totally reflect substantially all incident light emitted from the LED 11.

Describing this optical condition with reference to FIG. 5, when the end point P2 of the LED 11 is on the same side as point P on the top surface 30, with respect to optical axis 12, is set as the second reference point P2, the top surface 30 can be configured so as to satisfy the relationship:

$$\Delta R_2/(R_2\Delta\alpha_2)>1/\sqrt{(n^2-1)},$$

where $\alpha_2$ is the angle defined between the line that connects point P on the top surface 30 to the second reference point P2, and reference axis 15 parallel to the optical axis 12, $R_2$ is the distance from point P on the top surface 30 to the second reference point P2, $\Delta\alpha_2$ is the increment of $\alpha_2$, $\Delta R_2$ is an increment of $R_2$ with respect to $\Delta\alpha_2$, and n is the refractive index of the material of the lens 10.

Likewise, it is preferred that the side surface 40 be optically designed such that it emits light that is directly incident thereon to the outside of the lens 10. A detailed description will be given below for embodiments of the side surface 40 with reference to corresponding Figures.

Figure 6:
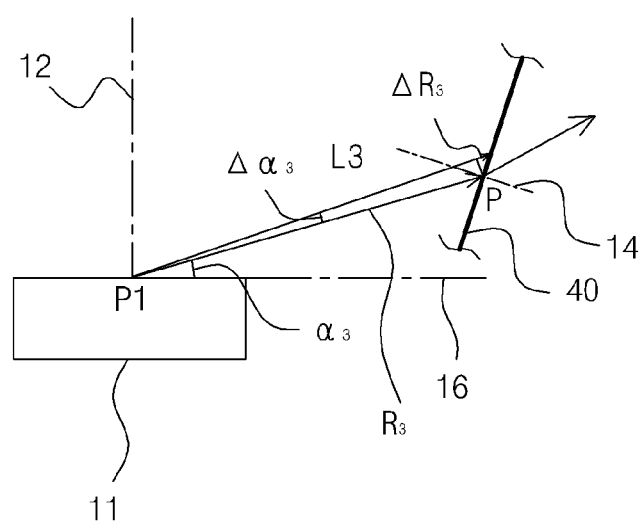
FIG. 6 to FIG. 8 are views illustrating embodiments of the side surface.

FIG. 6 is a view illustrating one embodiment of the side surface. With reference to FIG. 6, when the point of intersection between optical axis 12 and LED 11 is set as the first reference point P1, the side surface 40 can be configured so as to satisfy the relationship:

$$\Delta R_3/(R_3\Delta\alpha_3)<1/\sqrt{(n^2-1)},$$

where $\alpha_3$ is the angle defined between the line that connects point P in the side surface 40 to the first reference point P1 and horizontal axis 16 perpendicular to optical axis 12, $R_3$ is the distance from point P on the side surface 40 to the first reference point P1, $\Delta\alpha_3$ is an increment of $\alpha_3$, $\Delta R_3$ is an increment of $R_3$ with respect to $\Delta\alpha_3$, and n is the refractive index of the material of the lens 10.

Figure 7:
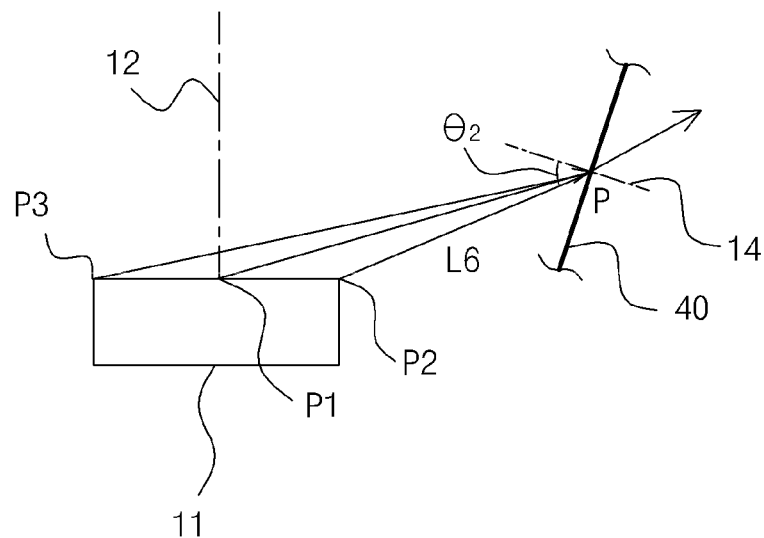
Figure 8:
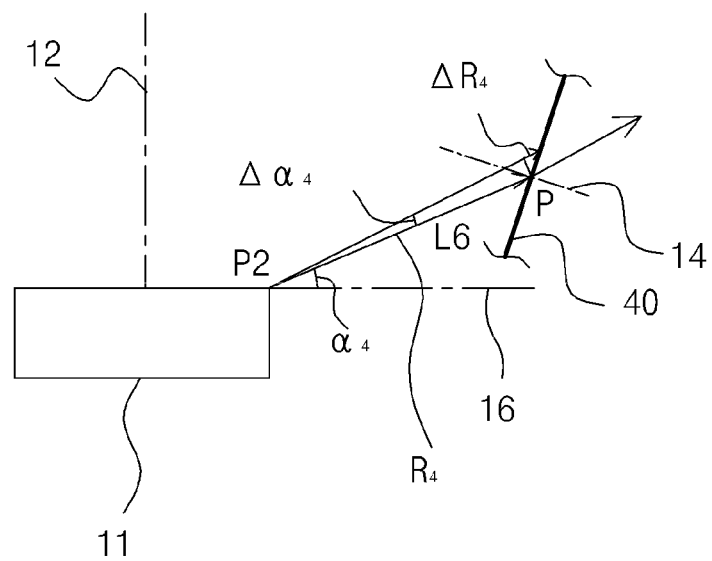

FIG. 7 and FIG. 8 are views illustrating alternative embodiments of the side surface.

Unlike the foregoing embodiment illustrated in FIG. 6, the optical condition of the side surface 40 shown in FIG. 7 and FIG. 8 is applicable when the LED 11 is a planar light source rather than a point light source.

First, with reference to FIG. 7, when the LED 11 is a planar light source instead of a point light source, not only light emitted from the center of LED 11 (i.e., the first reference point P1), but also light emitted from opposite end points P2 and P3 of LED 11 must be considered. In this case, a ray of light L6 is incident on the point P on the side surface 40 after being emitted from end point P2 of the LED 11 which is on the same side as point P with respect to optical axis 12. It can be appreciated that the angle $\theta_2$, defined by light L6 and the normal line 14 of point P is greater than the angle defined by normal line 14 and a ray of light that is incident on point P after being emitted from the opposite end point P3. Therefore, when the side surface 40 is configured so as to emit incident light L6 from end point P2 on the same side of LED 11 to the outside of the lens 10, and although the LED 11 is a planar light source, the side surface 40 can emit substantially all incident light from LED 11 to the outside of the lens 10.

Describing this optical condition with reference to FIG. 8, when end point P2 of LED 11, on the same side as point P on the side surface 40 with respect to optical axis 12, is set as the second reference point P2, the side surface 40 can be configured so as to satisfy the relationship:

$$\Delta R_4/(R_4 \Delta \alpha_4) < 1/\sqrt{(n^2-1)},$$

where $\alpha_4$ is the angle defined by the line that connects point P on side surface 40 to the second reference point P2 and horizontal axis 16 perpendicular to optical axis 12, $R_4$ is the distance from point P on side surface 40 to the second reference point P2, $\Delta \alpha_4$ is an increment of $\alpha_4$, $\Delta R_4$ is an increment of $R_4$ with respect to $\Delta \alpha_4$, and n is the refractive index of the material of the lens 10.

In the lens 10, according to the present invention as described above, the height (H) can be reduced by incorporation of central area 112 of incident surface 100, and the width (W) can be reduced due to incorporation of surrounding area 114 of incident surface 100. A detailed description will be given below of the configuration and operation of the central area 112 and the surrounding area 114, of which both can reduce the volume of the lens 10 according to the present invention.

Figure 9:
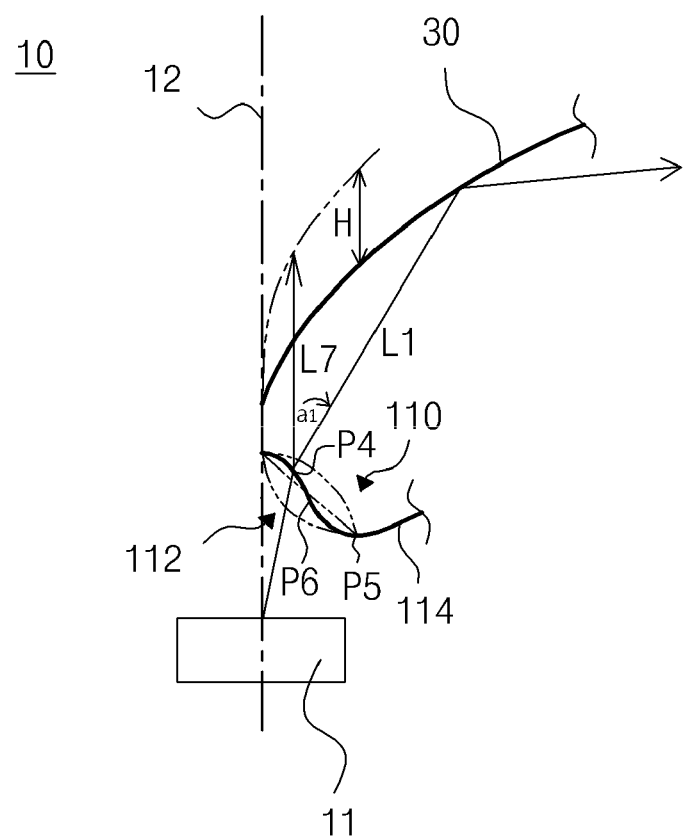
FIG. 9 is a view illustrating the configuration and operation of the central area.

FIG. 9 is a view illustrating the configuration and operation of the central area 112.

As shown in FIG. 9, when central area 112 of incident surface 100 refracts a ray of light L1 emitted from around optical axis 12 of LED 11 in a direction away from optical axis 12 (the direction is indicated with an arrow $a_1$) so that the light L1 is incident on the top surface 30, the angle defined between light L1 incident on top surface 30 and the optical axis 12 is increased. Therefore, the upward inclination of the top surface 30 for totally reflecting the light L1 can be reduced. In contrast, when a ray of light emitted from LED 11 is incident on top surface 30 in a substantially vertical direction parallel to the optical axis 12, as in the related art, the upward inclination of the top surface 30 for totally reflecting the light L7 is required to be very large. That is, as shown in FIG. 9, in the lens 10 according to the present invention, the height of the lens 10 can be reduced by about (H) due to central area 112 of the lens 10.

As such, in order to refract light L1 incident on point P4 in the central area 112 in a direction away from optical axis 12, the central area 112 can be configured such that it is oriented downward in a direction away from optical axis 12. In this case, the point of intersection P5 between central area 112 and the surrounding area 114 is the lowest end of central area 112.

For instance, as shown in FIG. 9, the vertical cross-section of central area 112 can be formed by a curve, the peak point of which is on optical axis 12. In another embodiment, the vertical cross-section of central area 112 can have a linear shape that is oriented downward at a preset angle, as in a downwardly convex shape, or an upwardly convex shape. In addition, an inflection point P6 may be present in central area 112 such that central area 112 can have a smooth curved shape at the point of intersection P5.

Figure 10:
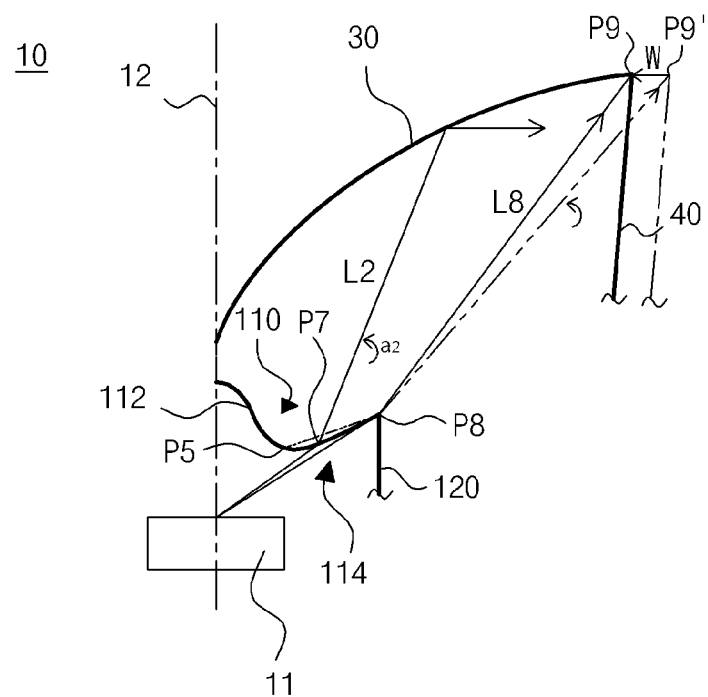
FIG. 10 is a view illustrating the configuration and operation of the surrounding area.

FIG. 10 is a view illustrating the configuration and operation of the surrounding area 114.

As shown in FIG. 10, the surrounding area 114 of incident surface 100 directs a ray of light L2 that is incident on a present point P7 in the surrounding area 114 to the upper surface 30 by refracting the light L2 in a direction towards optical axis 12 (direction of an arrow $a_2$). The light L2 becomes closer to the optical axis 12 when the light L2 is incident on the upper surface 30. Therefore, it is possible to reduce the width (or radius) of the lens 10 by becoming closer to the optical axis 12. In particular, a ray of light L8 is incident on the end point P8 on the edge of the surrounding area 114 and is refracted at the end point P8 such that it is incident at a point on upper surface 30 (i.e., at end point P9 on the edge of upper surface 30) of the lens 10 according to the present invention. As shown in FIG. 10, when the surrounding area 114 refracts light L8 in a direction towards optical axis 12, it is possible to change the end point on the edge of upper surface 30 from P9' to P9, thereby reducing the width of the lens 10 by approximately a width (W). Therefore, the more the surrounding area 114 refracts the light L2 incident on point P7 in the surrounding area 114 in the direction towards optical axis 12, the more the width of the lens 10 is reduced. In particular, when the angle at which light is refracted becomes greater by getting closer to the edge of the surrounding area 114, it is possible to directly reduce the width of the lens 10 by a larger amount.

In order to refract the light L2 incident on the point P7 in the central area 112 in a direction towards optical axis 12, the surrounding area 114 can be configured such that it is inclined upward in a direction away from optical axis 12. In this case, the point of intersection P5 between central area 112 and the surrounding area 114 becomes the lowest point of the central area 112 as well as the lowest point of the surrounding area 114. That is, the point of intersection P5 becomes the lowest end of the upper incident surface 110.

For instance, as shown in FIG. 10, the vertical cross-section of the surrounding area 114 can be a curve that is directed more upward in a direction away from the optical axis 12. In another embodiment, the vertical cross-section of the surrounding area 114 can be formed of a straight line that is inclined upward at a preset angle or has a shape that is convex downward. It is preferred that the surrounding area 114 be configured such that the incline of the tangent increases in a direction towards the edge thereof. In this configuration, in which the increment of the upward inline (i.e., the incline of the tangent) is increased in a direction towards the edge of the surrounding area 114, the angle of refraction in a direction towards optical axis 12 reaches a maximum at the end point P8 in the surrounding area 114. Consequently, the width of the lens 10 can be directly reduced to a minimum amount, which is preferable.

Figure 11:
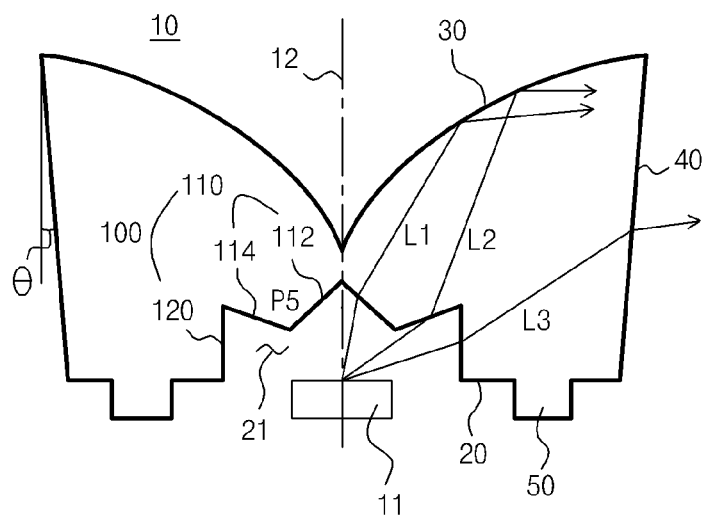
FIG. 11 is a vertical cross-sectional view showing a lens according to another embodiment of the present invention.

FIG. 11 is a vertical cross-sectional view showing a lens according to another embodiment of the present invention.

With reference to FIG. 11, the lens 10 according to this embodiment is configured such that the cross-section of the central area 112 has a linear shape that is inclined downward in a direction away from optical axis 12, and the cross-section of the surrounding area 114 has a linear shape that is inclined upward in a direction away from optical axis 12. In this case, the point of intersection P5 between the central area 112 and the surrounding area 114 is a nadir, which is the lowest end of upper incident surface 110. However, as described above, the lens 10 according to the invention is not limited to specific shapes of the central area 112 and the surrounding area 114, but can have any shape with which the height (H) and the width (W) of the lens 10 can be reduced.

Figure 12:
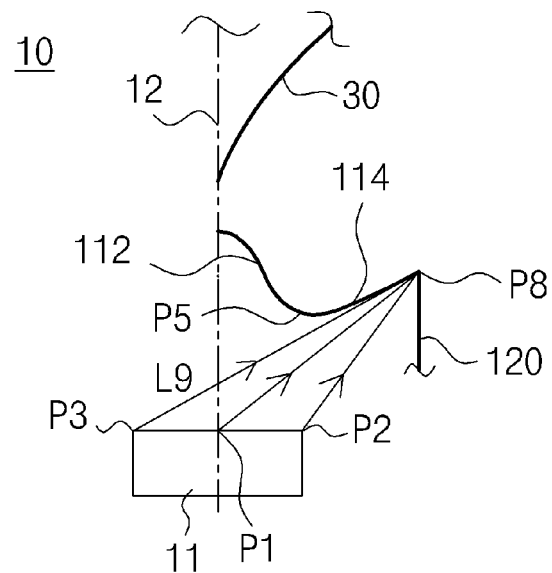
FIG. 12 is a view illustrating a desirable condition for the surrounding area.

FIG. 12 is a view illustrating a desirable condition for the surrounding area 114.

With reference to FIG. 12, the surrounding area 114 must be configured such that a ray of light L9 that is incident on end point P8 on the edge of surrounding area 114, after being emitted from LED 11, is not incident on any other point of surrounding area 114 while traveling to end point P8 in order to reduce and control the loss of light emitted from LED 11, as intended. In particular, when the light source of LED 11 is a planar light source instead of a point light source, not only light emitted from the first reference point P1, at the center of LED 11, but also light emitted from the opposite end points P2 and P3 the LED 11 must be considered. As shown in FIG. 12, when light L9 emitted from end point P3 of LED 11, that is opposite the end point P8 on the edge of surrounding area 114 with respect to optical axis 12, is incident on end point P8, if the path of light L9 is not altered by the surrounding area 114, light emitted from the other points P1 and P2 of LED 11 will also satisfy the same condition.

Accordingly, it is preferred that the point of intersection P5 between surrounding area 114 and central area 112 (i.e., the lowest point P5 of upper incident surface 110) be positioned on an imaginary straight line that connects end point P8 on the edge of surrounding area 114 to end point P3 of LED 11 opposite the end point P8 with respect to optical axis 12. It is also preferred that the surrounding area 114 be positioned on the imaginary straight line.

Figure 13:
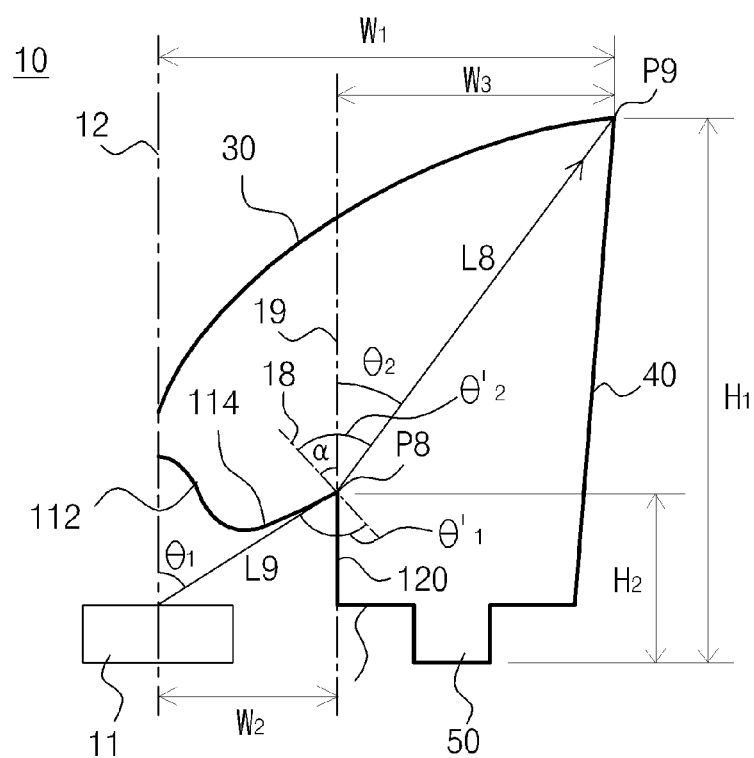
FIG. 13 is a view illustrating an example of the determination of the volume of the lens according to the present invention.

FIG. 13 is a view illustrating an example of the determination of the volume of the lens according to the present invention. FIG. 13 illustrates an example in which the overall volume of the lens 10 is determined based on the width (or radius) of the lens 10 determined by calculating the position of the end point P9 on the upper edge of the lens 10 depending on the shape of the surrounding area 114.

The volume (i.e., the height and width) of the lens 10 according to the invention can be determined by the central area 112 and the surrounding area 114 of incident surface 100. In particular, the light L9 that is incident on end point P8 on the edge of surrounding area 114, after being emitted from LED 11, is refracted at the end point P8 in a direction towards optical axis 12, and the point where the refracted light L8 strikes the upper surface 30 becomes the end point P9 on the upper edge of the lens 10. That is, the width (or radius) of the lens 10 is determined depending on the angle at which the light L9 emitted from LED 11 is refracted at the end point P8 of the surrounding area 114. The angle of refraction varies depending on the shape of the surrounding area 114 at the end point P8. Here, the light L9 incident on end point P8 of surrounding area 114 can be a ray of light emitted from the first reference point P1, or the center of LED 11 when LED 11 is a point light source. When LED 11 is a planar light source, the light L9 can be a ray of light emitted from end point P3 of LED 11 that is opposite end point P8 with respect to optical axis 12. This will be described in detail as follows with reference to the Figures.

The width (or radius) of the lens 10 satisfies the following formulae:

$$W_1 = W_2 + W_3,$$

$$\tan\theta_2 = W_3/(H_1-H_2) \rightarrow W_3 = (H_1-H_2)\ast\tan\theta_2, \text{ and}$$

$$n\ast\sin\theta'_2 = \sin\theta'_1 (\theta'_1 = \theta_1+\alpha, \theta'_2 = \theta_2+\alpha) \rightarrow \theta_2 = \sin^{-1}((1/n)\ast\sin(\theta_1+\alpha))-\alpha,$$

where n is the refractive index of the material of the lens 10, $W_1$ is the width (or radius) of the lens 10 (i.e., the distance or radius from optical axis 12 to end point P9 on the upper edge of the lens 10 where the refracted light L8 strikes upper surface 30), $W_2$ is the distance (width or radius) from optical axis 12 to end point P8 on the edge of the surrounding area 114, $W_3$ is the distance from end point P8 on the edge of surrounding area 114 to end point P9 on the upper edge of the lens 10, $H_1$ is the height of the lens 10 (i.e., the height at the end point P9 on the upper edge), $H_2$ is the height at the end point P8 on the edge of the surrounding area 114, $\theta_1$ is the angle defined between optical axis 12 and the light L9 that is incident on end point P8 after being emitted from the first reference point P1 (i.e., the point of intersection P1 between optical axis 12 and LED 11, or end point P2 of LED 11 that is opposite end point P8 with respect to optical axis 12), $\theta'_1$ is the incident angle of the light L9 at the end point P8, $\alpha$ is the angle defined between a normal line 18 and an imaginary vertical line 19 at the end point P8, the imaginary vertical line 19 being parallel to optical axis 12, $\theta_2$ is the angle defined between the refracted light L8, which is produced due to refraction of incident light L9 at end point P8, and the vertical line 19, and $\theta'_2$ is the angle at which the light L8 is refracted at the end point P8.

Figure 14:
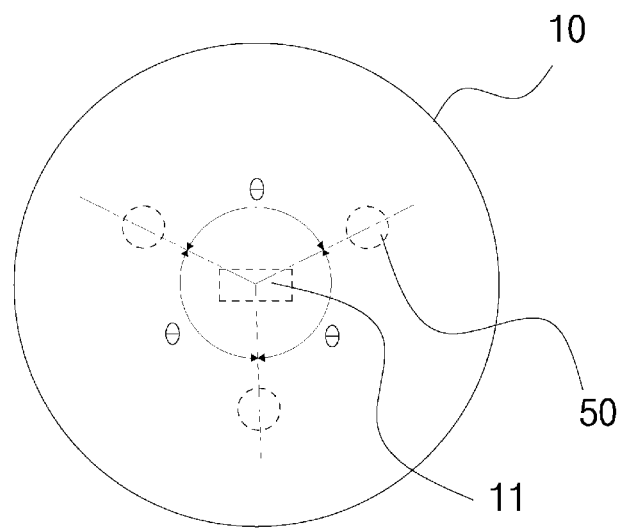
FIGS. 14 and 15 are schematic plan views showing a lens according to an embodiment of the present invention.
Figure 15:
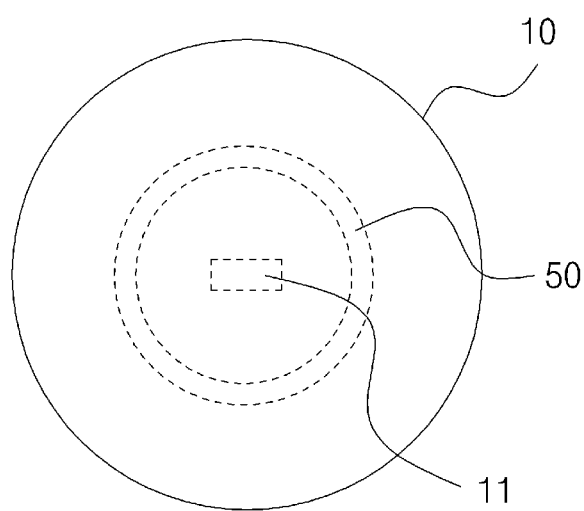

FIGS. 14 and 15 are schematic plan views showing a lens according to one embodiment of the present invention.

With reference to FIG. 14 and FIG. 15, the lens 10 according to one embodiment of the present invention can have a substantially circular shape when viewed from above. As shown in FIG. 14, a plurality of legs 50 can be provided at preset distances from the LED 11, arranged at preset angles θ with respect to the LED 11. As shown in FIG. 15, a leg 50 can be continuously provided at a preset distance from the LED 11 such that it has a substantially circular rim.

According to the present invention as set forth above, it is possible to reduce material costs of the side-emitting LED lens by reducing its overall volume and improving the light efficiency of the LED using as a planar light source as a LED light source. The embodiments of the side-emitting LED lens can be modified into a variety of forms. Accordingly, it should be understood that the present invention is not limited to the embodiments disclosed within the specification whereby modifications apparent to a person having ordinary skill in the art fall within the scope of the present invention.

What is claimed is:

1. A side-emitting LED lens which causes light that is emitted from an LED to exit a lens through a side surface of the lens, the side-emitting LED lens comprising:
    a top surface which reflects light that has entered the side-emitting LED lens through an incident surface and is directly incident on the top surface;
    a bottom surface having a recess and having the incident surface formed as an inner surface of the recess through which light emitted from the LED enters the side-emitting LED lens, the incident surface comprising:
        a central area which includes an optical axis of the LED, wherein the central area directs light emitted from the LED to the top surface by refracting the light in a direction away from the optical axis, whereby a height of the side-emitting LED lens can be reduced; and
        a surrounding area connected to the central area, wherein the surrounding area directs light emitted from the LED to the top surface by refracting the light in a direction toward the optical axis, whereby a width or radius of the side-emitting LED lens can be reduced; and
    a side surface which connects the bottom surface to the top surface, and through which light that is directly incident on the side surface and is reflected from the top surface from among light that has entered the side-emitting LED lens through the incident surface exits the side-emitting LED lens, wherein, when a point of intersection between the LED and the optical axis of the LED is set as a first reference point (P1), the top surface is configured so as to satisfy the relationship of Formula 1:

$$\Delta R_1/(R_1 \Delta\alpha_1) > 1/\sqrt{(n^2-1)} \quad \text{[Formula 1]}$$

where $\alpha_1$ is an angle defined between a line that connects a predetermined point on the top surface to the first reference point (P1) and the optical axis, $R_1$ is a distance from the predetermined point in the top surface to the first reference point (P1), $\Delta\alpha_1$ is an increment of $\alpha_1$, $\Delta R_1$ is an increment of $R_1$ with respect to $\Delta\alpha_1$, and n is a refractive index of a material of the side-emitting LED lens.

2. A side-emitting LED lens which causes light that is emitted from an LED to exit a lens through a side surface of the lens, the side-emitting LED lens comprising:

a top surface which reflects light that has entered the side-emitting LED lens through an incident surface and is directly incident on the top surface;

a bottom surface having a recess and having the incident surface formed as an inner surface of the recess through which light emitted from the LED enters the side-emitting LED lens, the incident surface comprising:
  a central area which includes an optical axis of the LED, wherein the central area directs light emitted from the LED to the top surface by refracting the light in a direction away from the optical axis, whereby a height of the side-emitting LED lens can be reduced; and
  a surrounding area connected to the central area, wherein the surrounding area directs light emitted from the LED to the top surface by refracting the light in a direction toward the optical axis, whereby a width or radius of the side-emitting LED lens can be reduced; and a side surface which connects the bottom surface to the top surface, and through which light that is directly incident on the side surface and is reflected from the top surface from among light that has entered the side-emitting LED lens through the incident surface exits the side-emitting LED lens, wherein, when an end point of the LED that is on the same side as a predetermined point on the top surface with respect to the optical axis is set as a second reference point (P2), the top surface is configured so as to satisfy the relationship of Formula 2:

$$\Delta R_2/(R_2 \Delta\alpha_2) > 1/\sqrt{(n^2-1)} \qquad \text{[Formula 2]}$$

where $\alpha_2$ is an angle defined between a line that connects the predetermined point on the top surface to the second reference point (P2) and a reference axis that is parallel to the optical axis, $R_2$ is a distance from the predetermined point on the top surface to the second reference point (P2), $\Delta\alpha_2$ is an increment of $\alpha_2$, $\Delta R_2$ is an increment of $R_2$ with respect to $\Delta\alpha_2$, and n is a refractive index of a material of the side-emitting LED lens.

3. A side-emitting LED lens which causes light that is emitted from an LED to exit a lens through a side surface of the lens, the side-emitting LED lens comprising:

a top surface which reflects light that has entered the side-emitting LED lens through an incident surface and is directly incident on the top surface;

a bottom surface having a recess and having the incident surface formed as an inner surface of the recess through which light emitted from the LED enters the side-emitting LED lens, the incident surface comprising:
  a central area which includes an optical axis of the LED, wherein the central area directs light emitted from the LED to the top surface by refracting the light in a direction away from the optical axis, whereby a height of the side-emitting LED lens can be reduced; and
  a surrounding area connected to the central area, wherein the surrounding area directs light emitted from the LED to the top surface by refracting the light in a direction toward the optical axis, whereby a width or radius of the side-emitting LED lens can be reduced; and a side surface which connects the bottom surface to the top surface, and through which light that is directly incident on the side surface and is reflected from the top surface from among light that has entered the side-emitting LED lens through the incident surface exits the side-emitting LED lens, wherein, when a point of intersection between the optical axis and the LED is set as a first reference point (P1), the side surface is configured so as to satisfy the relationship of Formula 3:

$$\Delta R_3/(R_3 \Delta\alpha_3) < 1/\sqrt{(n^2-1)} \qquad \text{[Formula 3]}$$

where $\alpha_3$ is an angle defined between a line that connects a predetermined point on the side surface to the first reference point (P1) and a horizontal axis that is perpendicular to the optical axis, $R_3$ is an increment of $\alpha_3$, $\Delta\alpha_3$ is an increment of $\alpha_3$, $\Delta R_3$ is an increment of $R_3$ with respect to $\Delta\alpha_3$, and n is a refractive index of a material of the side-emitting LED lens.

4. A side-emitting LED lens which causes light that is emitted from an LED to exit a lens through a side surface of the lens, the side-emitting LED lens comprising:

a top surface which reflects light that has entered the side-emitting LED lens through an incident surface and is directly incident on the top surface;

a bottom surface having a recess and having the incident surface formed as an inner surface of the recess through which light emitted from the LED enters the side-emitting LED lens, the incident surface comprising:
  a central area which includes an optical axis of the LED, wherein the central area directs light emitted from the LED to the top surface by refracting the light in a direction away from the optical axis, whereby a height of the side-emitting LED lens can be reduced; and
  a surrounding area connected to the central area, wherein the surrounding area directs light emitted from the LED to the top surface by refracting the light in a direction toward the optical axis, whereby a width or radius of the side-emitting LED lens can be reduced; and a side surface which connects the bottom surface to the top surface, and through which light that is directly incident on the side surface and is reflected from the top surface from among light that has entered the side-emitting LED lens through the incident surface exits the side-emitting LED lens, wherein, when an end point of the LED on the same side of a predetermined point on the side surface with respect to the optical axis is set as a second reference point (P2), the side surface is configured so as to satisfy the relationship of Formula 4:

$$\Delta R_4/(R_4 \Delta\alpha_4) < 1/\sqrt{(n^2-1)} \qquad \text{[Formula 4]}$$

where $\alpha_4$ is an angle defined between a line that connects the predetermined point on the side surface to the second reference point (P2) and a horizontal axis that is perpendicular to the optical axis, $R_4$ is a distance from the predetermined point on the side surface to the second reference point (P2), $\Delta\alpha_4$ is an increment of $\alpha_4$, ΔR₄ is an increment of R₄ with respect to Δα₄, and n is a refractive index of a material of the side-emitting LED lens.

5. The side-emitting LED lens according to claim 1, wherein a shape of the side surface is parallel to the optical axis of the LED or inclined inward.

6. The side-emitting LED lens according to claim 1, further comprising a leg that extends downward from a predetermined position of the bottom surface to support the side-emitting LED lens.

7. The side-emitting LED lens according to claim 1, wherein a shape of the central area is inclined downward in a direction away from the optical axis, and a shape of the surrounding area is inclined upward in a direction away from the optical axis.

8. The side-emitting LED lens according to claim 7, wherein a vertical cross-section of the central area has a curved shape, a peak point of which is on the optical axis, and a vertical cross-section of the surrounding area has a curved shape that is directed more upward in a direction away from the optical axis.

9. The side-emitting LED lens according to claim 7, wherein a vertical cross-section of the central area has a linear shape that is inclined downward in a direction away from the optical axis, and a vertical cross-section of the surrounding area has a linear shape that is inclined upward in the direction away from the optical axis.

10. The side-emitting LED lens according to claim 1, wherein a point of intersection between the central area and the surrounding area is positioned on an imaginary straight line that connects an end point on an edge of the surrounding area to an end point of the LED that is opposite the end point on the edge of the surrounding area with respect to the optical axis.

11. The side-emitting LED lens according to claim 1, wherein light incident on an end point on an edge of the surrounding area after being emitted from a point of intersection between the optical axis and the LED is refracted at the end point on the edge of the surrounding area so as to strike an end point on an edge of the upper surface in a vertical cross-section.

12. The side-emitting LED lens according to claim 1, wherein light incident on an end point on an edge of the surrounding area after being emitted from an end point of the LED that is opposite the end point on the edge of the surrounding area with respect to the optical axis is refracted at the end point on the edge of the surrounding area so as to strike an end point on an edge of the upper surface in a vertical cross-section.

13. A side-emitting LED lens which causes light that is emitted from an LED to exit a lens through a side surface of the lens, the side-emitting LED lens comprising:
   a top surface which reflects light that has entered the side-emitting LED lens through an incident surface and is directly incident on the top surface;
   a bottom surface having a recess and having the incident surface formed as an inner surface of the recess through which light emitted from the LED enters the side-emitting LED lens, the incident surface comprising:
      a central area which includes an optical axis of the LED, wherein the central area directs light emitted from the LED to the top surface by refracting the light in a direction away from the optical axis, whereby a height of the side-emitting LED lens can be reduced; and
      a surrounding area connected to the central area, wherein the surrounding area directs light emitted from the LED to the top surface by refracting the light in a direction toward the optical axis, whereby a width or radius of the side-emitting LED lens can be reduced; and
   a side surface which connects the bottom surface to the top surface, and through which light that is directly incident on the side surface and is reflected from the top surface from among light that has entered the side-emitting LED lens through the incident surface exits the side-emitting LED lens, wherein a distance or width from the optical axis to an end point on an edge of the upper surface in a vertical cross-section satisfies the Formula 5:

$$W_1 = W_2 + (H_1 - H_2) * \tan(\sin^{-1}((1/n) * \sin(\theta_1 + \alpha)) - \alpha) \quad \text{[Formula 5]}$$

where $W_1$ is the distance or width from the optical axis to the end point on the edge of the upper surface, $W_2$ is a distance, width or radius from the optical axis to an end point on an edge of the surrounding area, $H_1$ is a height of the side-emitting LED lens 10 or a height at the end point on the edge of the upper surface, $H_2$ is a height at an end point on the edge of the surrounding area, n is a refractive index of a material of the lens, $\theta_1$ is an angle defined between the optical axis and the light that is incident on the end point on the edge of the surrounding area after being emitted from a point of intersection between the optical axis and the LED, and α is an angle defined between a normal line and an imaginary vertical line at the end point on the edge of the surrounding area, the imaginary vertical line being parallel to the optical axis.

14. A side-emitting LED lens which causes light that is emitted from an LED to exit a lens through a side surface of the lens, the side-emitting LED lens comprising:
   a top surface which reflects light that has entered the side-emitting LED lens through an incident surface and is directly incident on the top surface;
   a bottom surface having a recess and having the incident surface formed as an inner surface of the recess through which light emitted from the LED enters the side-emitting LED lens, the incident surface comprising:
      a central area which includes an optical axis of the LED, wherein the central area directs light emitted from the LED to the top surface by refracting the light in a direction away from the optical axis, whereby a height of the side-emitting LED lens can be reduced; and
      a surrounding area connected to the central area, wherein the surrounding area directs light emitted from the LED to the top surface by refracting the light in a direction toward the optical axis, whereby a width or radius of the side-emitting LED lens can be reduced; and
   a side surface which connects the bottom surface to the top surface, and through which light that is directly incident on the side surface and is reflected from the top surface from among light that has entered the side-emitting LED lens through the incident surface exits the side-emitting LED lens, wherein a distance or width from the optical axis to an end point on an edge of the upper surface in a vertical cross-section satisfies the Formula 5:

$$W_1 = W_2 + (H_1 - H_2) * \tan(\sin^{-1}((1/n) * \sin(\theta_1 + \alpha)) - \alpha) \quad \text{[Formula 5]}$$

where $W_1$ is the distance or width from the optical axis to the end point on the edge of the upper surface, $W_2$ is a distance, width or radius from the optical axis to an end point on an edge of the surrounding area, $H_1$ is a height of the side-emitting LED lens 10 or a height at the end point on the edge of the upper surface, $H_2$ is a height at an end point on the edge of the surrounding area, n is a refractive index of a material of the side-emitting LED lens, $\theta_1$ is an angle defined between the optical axis and light that is incident on the end point on the edge of the surrounding area after being emitted from an end point of the LED that is opposite the end point on the edge of the surrounding area, and α is an angle defined between a normal line and an imaginary vertical line at the end point on the edge of the surrounding area, the imaginary vertical line being parallel to the optical axis.

15. A backlight unit comprising:

an LED light source; and the side-emitting LED lens of claim 1 positioned above the LED light source.

16. A display device comprising:

an LED light source; and the side-emitting LED lens of claim 1 positioned above the LED light source.

17. A side-emitting LED lens which causes light that is emitted from an LED to exit a lens through a side surface of the lens, the side-emitting LED lens comprising:

a top surface which reflects light that has entered the side-emitting LED lens through an incident surface and is directly incident on the top surface;

a bottom surface having the incident surface through which light emitted from the LED enters the side-emitting LED lens, the incident surface comprising:

a central area which includes an optical axis of the LED, wherein the central area directs light emitted from the LED to the top surface by refracting the light in a direction away from the optical axis, whereby a height of the side-emitting LED lens can be reduced; and a surrounding area connected to the central area, wherein the surrounding area directs light emitted from the LED to the top surface by refracting the light in a direction toward the optical axis, whereby a width or radius of the side-emitting LED lens can be reduced; and a side surface which connects the bottom surface to the top surface, and through which light that is directly incident on the side surface and is reflected from the top surface from among light that has entered the side-emitting LED lens through the incident surface exits the side-emitting LED lens, wherein a shape of the central area is inclined downward in a direction away from the optical axis, and a shape of the surrounding area is inclined upward in a direction away from the optical axis, wherein a vertical cross-section of the central area has a curved shape, a peak point of which is on the optical axis, and an inflection point, and a vertical cross-section of the surrounding area has a curved shape that is directed more upward in a direction away from the optical axis.

18. The side-emitting LED lens according to claim 17, wherein a shape of the side surface is parallel to the optical axis of the LED or inclined inward.

19. The side-emitting LED lens according to claim 17, further comprising a leg that extends downward from a predetermined position of the bottom surface to support the side-emitting LED lens.

20. A backlight unit comprising:

an LED light source; and the side-emitting LED lens of claim 17, positioned above the LED light source.

21. A display device comprising:

an LED light source; and the side-emitting LED lens of claim 17, positioned above the LED light source.

\* \* \* \* \*